Figure 1:
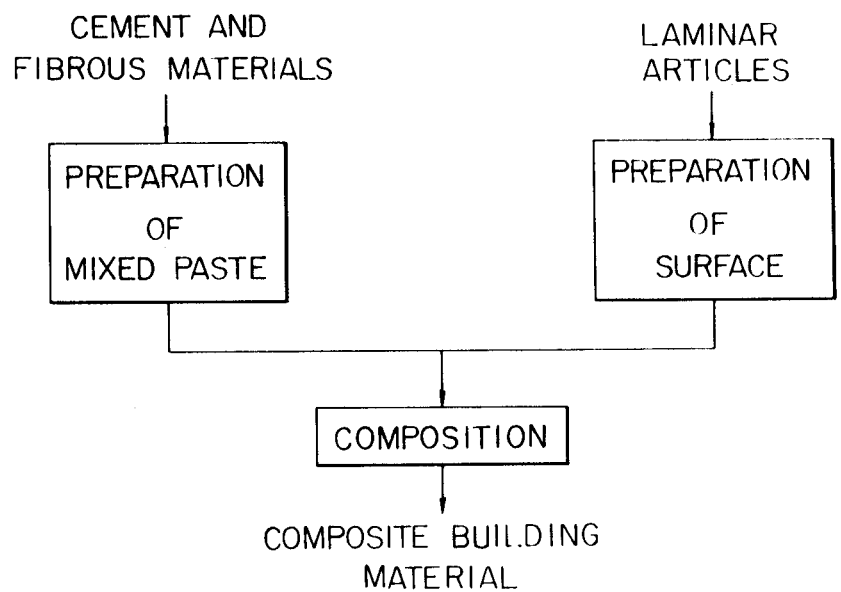

United States Patent

[11] 3,607,605

| [72] | Inventor | Kazuo Suzukawa<br>Koga-gun, Shiga-ken, Japan |
|---|---|---|
| [21] | Appl. No. | 646,506 |
| [22] | Filed | June 16, 1967 |
| [45] | Patented | Sept. 21, 1971 |
| [73] | Assignee | Toray Engineering Co., Ltd.<br>Osaka-shi, Osaka, Japan |
| [32] | Priority | June 23, 1966, Nov. 14, 1966 |
| [33] | | Japan |
| [31] | | 41/40385, 41/104475 |

[54] COMPOSITE BUILDING MATERIAL
6 Claims, 12 Drawing Figs.

[52] U.S. Cl. .................................................. 161/161,
156/43, 156/79, 161/162, 161/182, 264/42
[51] Int. Cl. ...................................................... B28b 1/50
[50] Field of Search ........................................... 106/87, 99;
264/42; 161/160, 161, 162, 182, 192, 271; 156/39,
41, 43, 44, 79

[56] References Cited
UNITED STATES PATENTS

| 1,890,674 | 12/1932 | Delaney ....................... | 156/43 |
| 2,079,664 | 5/1937 | Seigle ........................... | 264/42 |
| 2,421,721 | 6/1947 | Smith et al. ................... | 106/99 |
| 3,442,991 | 5/1969 | Lanz ............................. | 264/333 |

FOREIGN PATENTS

| 869,767 | 3/1953 | Germany ...................... | 156/41 |
| 1,107,660 | 8/1955 | France ......................... | 156/43 |
| 774,049 | 5/1957 | Great Britain ................ | 161/161 |

*Primary Examiner*—William J. Van Balen
*Attorneys*—Robert E. Burns and Emmanuel J. Lobato

ABSTRACT: An improved composite building material, which comprises a pair of laminar articles, a core material made of mixed paste of foaming cement containing fibrous materials infused into a determined intervening space between the laminar articles for composing them, and plurality of connecting blocks positioned in the space when stronger bonding required.

Fig. 7  Fig. 8  Fig. 9
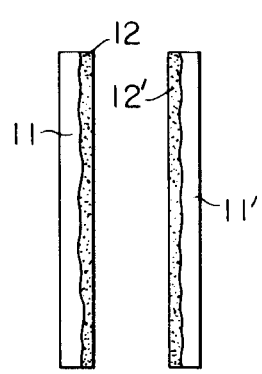
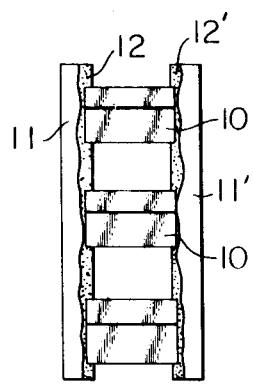
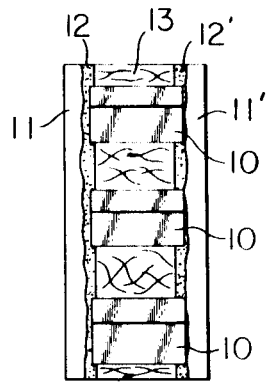
Fig. 10
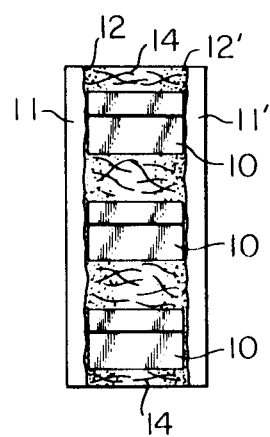
Fig. 11
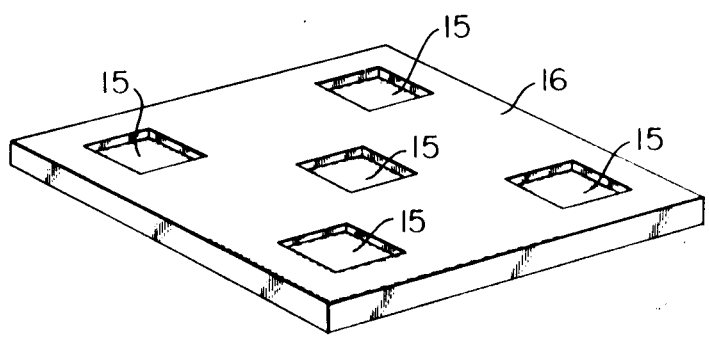

COMPOSITE BUILDING MATERIAL

The present invention relates to an improved composite building material having core material made of foaming cement and its manufacturing method, more particularly relates to an improved composite building material and its manufacturing method comprising a plurality of platelike substances and an intervening core material which is made of foaming cement containing fibrous material therein.

In the conventional method of manufacturing composite building material, joining of laminar articles with an intervening core material is carried out by joining them while they are both still in the paste condition, or by joining them with a bonding agent after they have been respectively formed. However, in case of the former type of joining, the strength of the joints, depending upon respective inherent adhesiveness of each member, is not sufficient to withstand long use or impact loading, while in case of the latter type of joining, the strength of the joint provided by the bonding agent is greatly affected by the surface condition of each member, it does not have sufficient resistance to withstand long use and also, impact loading cannot always be expected.

The principal object of the present invention is to provide an improved composite building material and its manufacturing method having strong bond between platelike substances and the intervening core material.

The other object of the present invention is to provide an improved composite building material and its manufacturing method which can withstand long use, impact loading and repeated loading.

Further object of the present invention is to provide an improved composite building material having superior break resistance, elasticity and resistance against bonding and shearing forces.

The present invention will be better understood from the following description taken in connection with the accompanying drawings wherein a preferred embodiment of the present invention is clearly shown.

Figure 3:
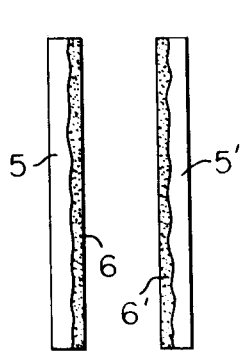
Figure 4:
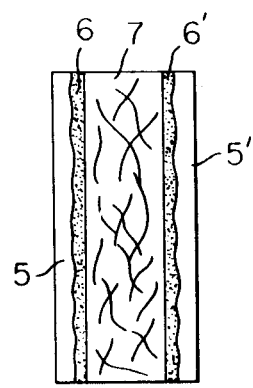
Figure 5:
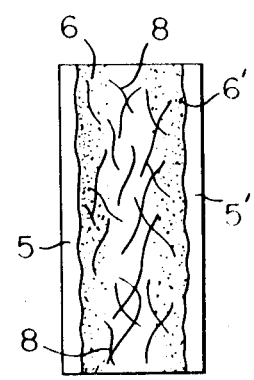
Figure 2:
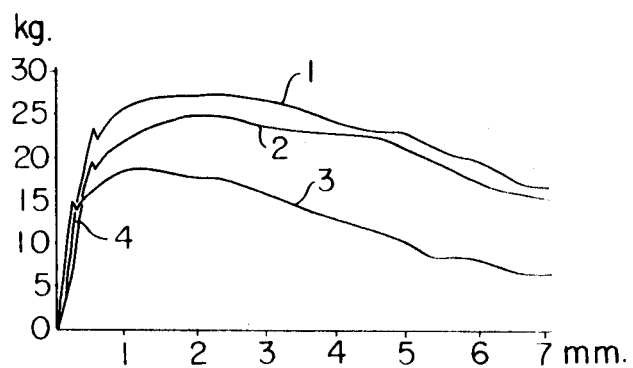
Figure 6:
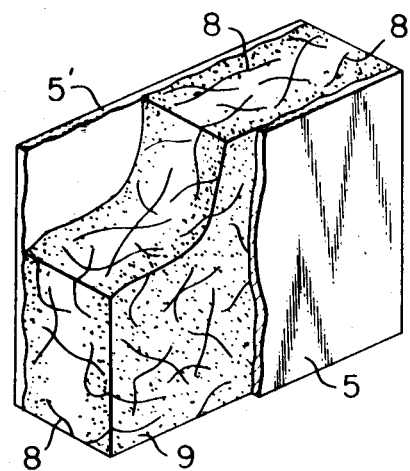
Figure 12:
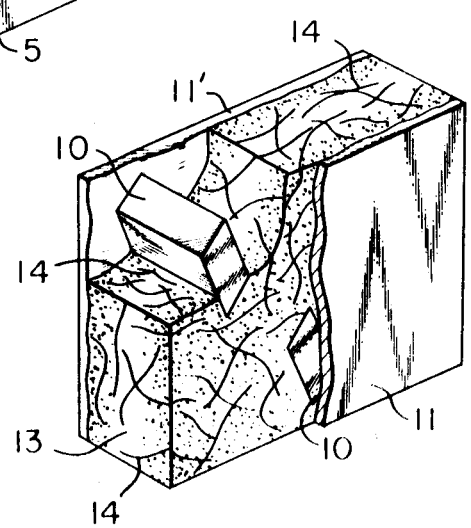

FIG. 1 is a schematic block diagram of the processes for manufacturing composite building material of the present invention, FIG. 2 is a graphical drawing showing the stress-strain property of fibrous intervening core material used in the present invention, FIGS. 3, 4 and 5 are sketches for showing an embodiment of the method for manufacturing a composite building material according to the present invention, FIG. 6 is an explanatory perspective view, with the platelike substance partly taken off for showing the structure of composite building material of the present invention, FIGS. 7, 8, 9 and 10 are sketches for showing another embodiment of the method for manufacturing composite building material according to the present invention, FIG. 11 is a perspective view of an embodiment of a platelike substance applied to the composite building material of the present invention, FIG. 12 is an explanatory perspective view, with the platelike substance, partly taken off for showing another structure of composite building material of the present invention.

In accordance with present invention, manufacturing of composite building material comprises three main processes, as shown in FIG. 1, wherein the first process is the preparation of the intervening core material of mixed paste of cement with fibrous materials, the second process is the preparation of the surfaces of laminar articles and the third process is the joining of the platelike substances with the intervening core material.

The foaming cement of paste used as the core material in the composite building material of the present invention is produced by mixing water, surface active agents, powdered metal, catalyst and fibrous materials successively in a vertical-type centrifugal mixer which is rotated at the speed from 250 to 300 r.p.m.

The catalyst is used to regulate the foaming speed of the paste of cement after mixing. Fluid parafin or asphalt emulsion is effective for accelerating the forming of the paste of cement, while caustic soda or calcium cyanide is effective for breaking the foam of the paste of cement.

The single or mixed fibrous material comprising at least one fibrous material chosen from a group of suitable materials, such as ordinary staple fibers, multifilaments, monofilaments, ribbon-shaped fibers and fibril fibers, and more particularly synthetic fibers of polypropylene, nylon, polyester, and vinylidene chloride can be used for the present invention.

Referring to FIG. 2, a stress-strain property of the foaming cement used for the core material containing polypropylene staple is shown, wherein the ordinate represents the bending stress in kilogram, while the abscissa represents the strain in millimeter. The amount of the polypropylene staple contained in the mixed paste of cement is 0.9 percent by weight for curve 1, 0.6 percent for curve 2, 0.3 percent for curve 3 and 0.1 percent for curve 4, respectively. It is evident from the drawing that the larger the amount of fibrous materials in the mixed paste of cement, the stronger is the resistance of the composite cement produced against bending force. It is preferable to make the amount of the fibrous materials contained in the mixed paste of cement 10 percent by weight or less of the paste of cement. Also, it is possible to mix asbestos fibers or glass fibers into the paste of cement instead of above-described fibrous materials in accordance with the requirement of the end use.

In the preparation of platelike substances, it is preferable to roughen one surface of each platelike substance and to cover the roughened surface with a suitable composing agent so as to provide stronger joints between the platelike substances and and the core material. The platelike substances used in the present invention can be chosen from a group composed of plaster board, veneer board or synthetic resin board in accordance with the requirement of the end use. The joining agent applied to the present invention is preferably compounds produced by mixing adhesive agents of latex type with cement in an amount from 20 to 40 percent by weight of the agent.

Referring to FIGS. 3, 4 and 5, the process of joining is shown, wherein, before the joining of the core material with the platelike substances 5, 5' which have been prepared in the above-described manner are held firmly in such a manner that the surface of each platelike substance 5, 5', which has been roughened and covered with composing agent 6, 6', faces each other with a definite intervening distance according to the requirement of the end use. Next, the paste of foaming cement 7 which has been produced in the foregoing process is infused gradually into the space between the platelike substances 6, 6', as shown in FIG. 4. The platelike substances 5, 5' and the paste of cement 7 are left standing for more than 8 hours, the expansion of the paste of foaming cement 7 takes place gradually, and the composing agent 6, 6' covering the inside surface of platelike substances 5, 5' begins to spread gradually into the paste of foaming cement 7 so as to bond with fibrous materials 8 scattered in the portion of the paste of foaming cement 7 adjacent to the roughened surfaces of the platelike substances 5, 5' as shown in FIG. 5. It is desirable to carry out the processes of the present invention within a closed casing because the high temperature and high pressure, which are caused by the heat and gaseous materials produced during the solidification of the foaming cement, enable stronger bonding between the platelike substances and the core materials.

Referring to FIG. 6, the structure of the composite building material of the present invention is shown, wherein two platelike substances 5, 5' are bonded together by an intervening core material 9 made of the paste of foaming cement which contains a definite quantity of fibrous materials 8. Thus, the manufactured composite building material of the present invention has the great advantage of strong adhesion between platelike substances 5, 5' and the intervening core material 9 as the result of the bonding effect between each member, composing agent and the composition between fibrous materials 8 randomly scattered in the core material 9 and a portion of composing agent spreading from the inside surface of platelike substances 5, 5' into the portion of the core material 9 adjacent to the roughened surfaces of the platelike substances 5, 5'. Furthermore, the composite building material of the present invention has a great resistance against external loading, the platelike substances 5, 5' resisting extension, compression, bending and impact forces, while the core material 9 resisting shearing force.

Another embodiment of the method for manufacturing composite building material according to the present invention is shown in FIGS. 7, 8, 9 and 10, wherein, before infusing the paste of foaming cement, a plurality of connecting blocks 10 are positioned within the space between the platelike substances 11, 11' and are joined to the inside surfaces of laminar articles 11, 11' by means of composing agent 12, 12' covering the inside surface of the platelike substances as shown in FIGS. 7 and 8. Next, the paste of foaming cement is infused into the intervening space between the platelike substances 11, 11' and the connecting blocks 10 in the same manner as described in the embodiment shown in FIGS. 3, 4 and 5. The connecting block applied to the present invention is preferably made of foaming cement having a specific gravity from 1.2 to 1.5 or it may be any solid material harder than it. And the shape of the connecting block should be designed in accordance with the requirement of the end use. It is further desirable to make hollow portions 15 on the inside surface of the platelike substance 16, as shown in FIG. 11 so that the connecting block can be fitted into it to provide increased joining strength between the surface of laminar articles and the connecting blocks.

The structure of composite building material thus manufactured is shown in FIG. 12, wherein two platelike substances 11, 11' are joined together by an intervening core material 13 made of the paste of foaming cement which contains a definite quantity of fibrous materials 14 and a plurality of connecting blocks 10. The composite building material thus manufactured has an additional advantage of strong resistance against bending and shearing force as the result of the joint effect of bonding among platelike substances, core material and connecting blocks.

The following examples are illustrative of the present invention, but are not to be construed as limiting the same.

EXAMPLE 1

1. Preparation of intervening core material

One hundred parts by weight of ordinary Portland cement is mixed completely with 0.17 parts by weight of powdered alminium. A small quantity of surface active agent and 0.5 parts by weight of polypropylene staple of $10^d \times 32$ mm. are mixed completely with 55 parts by weight of water in a vertical-type centrifugal mixer rotating at a speed from 250 to 300 r.p.m. Then the powdered mixture is infused gradually into the liquid mixture and mixed further so as to disperse the powdered alminium completely into the paste of cement. After the completion of dispersion of powdered alminium into the paste of cement, 0.3 parts by weight of caustic soda is added so as to regulate the foaming speed of the paste of cement.

2. Preparation of laminar articles

The roughened surface of laminar article made of asbestos is covered with a composing agent composed of 100 parts by weight of latex-type bonding agent and 30 parts by weight of Portland cement.

3. The platelike substances produced in the second process and held firmly at a definite distance in accordance with the requirement of the end use, the paste of cement produced in the first process is infused into the intervening space between the platelike substances when the composing agent has dried slightly. The composite building material thus manufactured according to the present invention is estimated to have 50 percent more strength against the force acting to separate the composite members when compared with conventional composite building material.

EXAMPLE 2

1. Preparation of intervening core material
Same as in the case of example 1
2. Preparation of laminar articles The roughened surface of the platelike substance made of asbestos is covered with a composing agent composed of 100 parts by weight of latex-type bonding agent and 30 parts by weight of Portland cement. Next, a plurality of connecting blocks, which are formed by cutting the same platelike substance used for the surface members of the composite building material, are positioned between the platelike substances and are joined to them by means of the composing agent described above. The thickness of the connecting blocks should be designed according to the requirement of the end use.

3. The platelike substance are held firmly together with intervening connecting blocks, the paste of cement produced in the first process is infused into the intervening space among the platelike substances and connecting blocks when the composing agent has dried slightly. The composite building material thus manufactured according to the present invention is estimated to have 80 percent more strength against the force acting to separate the composition members when compared with the conventional composite building material.

While the invention has been described in conjunction with certain embodiments thereof it is to be understood that various modifications and changes may be made without departing from the spirit and scope of the invention.

What is claimed is:

1. An improved composite building laminate, comprising a plurality of spaced plates selected from the group consisting of plaster board, veneer board, synthetic resin board and asbestos board, a plurality of connecting blocks positioned transversely between and in contact with said plates, and an intervening core material of solidified foamed inorganic cement containing fibrous materials for filling the space between said plates and for bonding to said plates and connecting blocks and wherein the inner surfaces of each of said plates is provided with a plurality of hollow portions with the connecting blocks inserted within said hollow portions.

2. An improved composite building laminate according to claim 1, wherein said fibrous material is at least one fibrous material chosen from the group consisting of ordinary staple fibers, multifilaments, monofilaments, ribbon shape fibers and fibril fibers.

3. An improved composite building laminate according to claim 1, wherein said fibrous material contains at least one fibrous material chosen from the group consisting of asbestos fibers and glass fibers.

4. An improved composite building laminate according to claim 1, wherein the amount of said fibrous materials contained in said foamed cement is less than 10 percent by weight of said foamed cement.

5. An improved composite building laminate according to claim 1, wherein each said plate is provided with one roughened surface in contact with the cement.

6. An improved composite building laminate according to claim 1 wherein said connecting blocks comprises solidified foamed cement having a specific gravity from 1.2 to 1.5.